US011068322B2

(12) United States Patent
Lunev et al.

(10) Patent No.: US 11,068,322 B2
(45) Date of Patent: *Jul. 20, 2021

(54) METHODS OF OPERATING COMPUTER SYSTEM WITH DATA AVAILABILITY MANAGEMENT SOFTWARE

(71) Applicant: Goldman Sachs & Co. LLC, New York, NY (US)

(72) Inventors: Julian Lunev, East Hanover, NJ (US); David Orelowitz, New York, NY (US); Robert Mendelow, West Orange, NJ (US)

(73) Assignee: Goldman Sachs & Co. LLC, New York, NY (US)

(*) Notice: Subject to any disclaimer, the term of this patent is extended or adjusted under 35 U.S.C. 154(b) by 3 days.

This patent is subject to a terminal disclaimer.

(21) Appl. No.: 16/042,136

(22) Filed: Jul. 23, 2018

(65) Prior Publication Data
US 2018/0329764 A1 Nov. 15, 2018

Related U.S. Application Data

(60) Continuation of application No. 13/549,217, filed on Jul. 13, 2012, now Pat. No. 10,031,787, which is a
(Continued)

(51) Int. Cl.
*G06F 9/54* (2006.01)
*G06Q 10/06* (2012.01)
(Continued)

(52) U.S. Cl.
CPC ............ *G06F 9/542* (2013.01); *G06F 9/4843* (2013.01); *G06F 9/5033* (2013.01); *G06Q 10/06* (2013.01); *G06F 2209/482* (2013.01)

(58) Field of Classification Search
CPC .............. G06F 9/4843; G06F 9/5033; G06F 2209/482; G06F 9/542; Y04S 10/54; G06Q 10/06
(Continued)

(56) References Cited

U.S. PATENT DOCUMENTS 5,715,397 A 2/1998 Ogawa et al.
6,088,704 A * 7/2000 Aiba ................. G06F 16/10
(Continued)

OTHER PUBLICATIONS

Bagchi et al., "Dependency Analysis in Distributed Systems Using Fault Injection: Application to Problem Determination in an E-Commerce Environment", 12th International Workshop on Distributed Systems: Operations and Management, Oct. 2001, 14 pages.
(Continued)

*Primary Examiner* — Kuen S Lu

(57) ABSTRACT

A method includes receiving, from one or more first applications, multiple indications that multiple first data items are available for processing. For each of the first data items, the method also includes (a) determining, using one or more of multiple data dependency rules, that a second data item is dependent for processing by a second application upon an availability of the first data item; (b) in response to the determination, changing a status of the first data item from unavailable to available for processing and/or changing a status of the second data item from unavailable to ready for processing; and (c) providing the status of the first data and/or the status of the second data item to the second application to enable the second application to process the second data item. Different data dependency rules are associated with different first data items and different second items.

18 Claims, 16 Drawing Sheets

Related U.S. Application Data division of application No. 11/293,576, filed on Dec. 2, 2005, now Pat. No. 8,224,770.

(51) Int. Cl.
    *G06F 9/48*      (2006.01)
    *G06F 9/50*      (2006.01)

(58) Field of Classification Search
    USPC .......................................................... 707/609
    See application file for complete search history.

(56) References Cited

U.S. PATENT DOCUMENTS

| | | | |
|---|---|---|---|
| 6,308,163 | B1 | 10/2001 | Du et al. |
| 6,434,533 | B1 | 8/2002 | Fitzgerald |
| 6,513,019 | B2 | 1/2003 | Lewis |
| 6,519,568 | B1 | 2/2003 | Harvey et al. |
| 6,772,131 | B1 | 8/2004 | Francis et al. |
| 6,782,403 | B1 * | 8/2004 | Kino ..................... G06F 16/258 |
| 7,031,979 | B2 | 4/2006 | Kauffman |
| 7,054,881 | B2 | 5/2006 | Arcand et al. |
| 7,326,117 | B1 * | 2/2008 | Best ..................... A63F 13/10 463/32 |
| 7,652,573 | B2 | 1/2010 | Donat et al. |
| 7,701,483 | B1 * | 4/2010 | Takiguchi .......... H04N 1/00204 348/207.11 |
| 8,224,770 | B2 | 7/2012 | Lunev et al. |
| 10,031,787 | B2 | 7/2018 | Lunev et al. |
| 2001/0034701 | A1 | 10/2001 | Fox et al. |
| 2002/0032640 | A1 | 3/2002 | LaFore et al. |
| 2002/0065752 | A1 | 5/2002 | Lewis |
| 2003/0040936 | A1 | 2/2003 | Nader et al. |
| 2003/0158811 | A1 | 8/2003 | Sanders et al. |
| 2004/0122873 | A1 * | 6/2004 | Wright, Jr. ............ G06F 3/0605 |
| 2004/0158563 | A1 | 8/2004 | Pawlowski et al. |
| 2004/0230986 | A1 * | 11/2004 | Limprecht .......... G06F 12/0261 719/315 |
| 2004/0243626 | A1 * | 12/2004 | Wyle ..................... G06F 21/41 |
| 2005/0187858 | A1 * | 8/2005 | Graham ................ G06Q 40/06 705/37 |
| 2006/0095520 | A1 * | 5/2006 | Berg ..................... G06F 21/57 709/206 |
| 2007/0130173 | A1 | 6/2007 | Lunev et al. |
| 2007/0150327 | A1 * | 6/2007 | Dromgold ........... G06F 16/2477 705/7.17 |
| 2007/0226678 | A1 * | 9/2007 | Li ........................ G06F 16/252 717/101 |
| 2011/0093868 | A1 * | 4/2011 | Bou-Ghannam ....... G06F 9/542 719/318 |
| 2012/0278279 | A1 | 11/2012 | Lunev et al. |

OTHER PUBLICATIONS

Bussler, "Enterprise-Wide Workflow Management", IEEE Concurrency, Jul.-Sep. 1999, pp. 32-43.

Computer Associates International, Inc., "Unicenter® AutoSys® Job Management Release 4.5", 2004, 6 pages.

Sadiq et al., "Data Flow and Validation in Workflow Modelling", Australian Computer Society, Inc., 2003, 8 pages.

Isard et al., "Dryad: Distributed Data-Parallel Programs from Sequential Building Blocks", Proceedings of the 2nd ACM SIGOPS/EuroSys European Conference on Computer Systems (EuroSys'07), Mar. 2007, 14 pages.

Computer Associates International, Inc., "Unicenter® AutoSys® Job Management for UNIX User Guide 4.5", 2003, 454 pages.

* cited by examiner

Exposure Analysis by Sector

Client: ABC Investments

Business Date: Aug. 10, 2005
Run Date: Aug. 11, 2005 07:46 AM EDT

| Product Description | Report Product ID | TD Qty Close | Average Unit Cost (Base) | Price Close (Base) | Price % Change from Cost | Total DLY P&L Incl. Div Int (Base) | Total MTD P&L Incl. Div Int (Base) |
|---|---|---|---|---|---|---|---|
| Cash - Cash | | | | | | | |
| EURO | EUR | (110,125) | 1.34 | 1.24 | (7.80) | (121) | (2,775) |
| JAPANESE YEN | JPY | 10,548,200 | 0.01 | 0.01 | (1.19) | 1,175 | 1,552 |
| US DOLLAR | USD | 66,917,245 | 1.00 | 1.00 | 0.00 | 0 | 0 |
| UK POUND STERLING | GBP | 12,407 | 1.82 | 1.80 | (1.17) | 110 | 468 |
| TOTAL Cash - Cash | | | | | | 1,164 | (755) |
| TOTAL Cash | | | | | | 1,164 | (755) |
| Consumer Discretionary - Long | | | | | | | |
| BURBERRY GROUP PLC.COMN | 3174300 | 130,600 | 6.72 | 7.72 | 14.93 | 24,826 | 36,663 |
| CIRCUIT CITY STORES, INC.COMN | CC | 61,500 | 11.24 | 17.64 | 56.98 | 0 | (37,915) |
| DIRECTV GROUP INC.COMN | DTV | 47,500 | 15.56 | 16.19 | 4.07 | (9,500) | 37,525 |
| EBAY INC.CMC | EBAY | 195,000 | 30.65 | 41.61 | 35.78 | (237,550) | (33,650) |
| HOVNANIAN K ENTERPRISES INC.OMN CLASS A | HOV | 240,000 | 19.55 | 60.97 | 211.85 | (254,400) | (2,330,400) |
| POLO RALPH LAUREN CORPORATION CLASS A COMMON STOCK | RL | 40,000 | 29.99 | 52.50 | 75.04 | 20,800 | 130,400 |
| TIFFANY & CO.OMN | TIF | 36,400 | 31.55 | 34.51 | 9.37 | 17,836 | 17,472 |
| TIME WARNER INC.COMN | WWX | 44,000 | 15.56 | 18.24 | 17.25 | (13,200) | 53,680 |
| TIVO INC.OMN | TIVO | 68,000 | 6.13 | 5.99 | (2.20) | (4,080) | (17,680) |
| UNIVISION COMMUNICATIONS, INC.CLASS A | UVN | 135,000 | 27.18 | 27.00 | (0.65) | (1,350) | (172,800) |
| TOTAL Consumer Discretionary - Long | | | | | | (456,688) | (2,316,318) |

\*
\*
\*

| | | | | | | | |
|---|---|---|---|---|---|---|---|
| GRAND TOTAL | | | | | | 312,792 | 1,147,240 |

*FIG. 6A*

METHODS OF OPERATING COMPUTER SYSTEM WITH DATA AVAILABILITY MANAGEMENT SOFTWARE

CROSS-REFERENCE TO RELATED APPLICATIONS AND PRIORITY CLAIM

This application is a continuation of U.S. patent application Ser. No. 13/549,217 filed on Jul. 13, 2012 (now U.S. Pat. No. 10,031,787), which is a divisional of U.S. patent application Ser. No. 11/293,576 filed on Dec. 2, 2005 (now U.S. Pat. No. 8,224,770). These applications are hereby incorporated by reference in their entireties.

FIELD

The present invention relates to computer systems. In some embodiments, the present invention relates to methods for coordinating operation of various application programs that execute on a computer system.

BACKGROUND

It is well known to operate a number of different application software programs in the same computer system. In some cases, operations of the various application programs may be dependent on data or other outputs of one or more other application programs that operate on the same computer system. In such cases, it may be necessary or desirable for operation of at least some of the application programs to be coordinated.

One computer program that is used to coordinate operation of different applications on a computer system is known as "Unicenter AutoSys Job Management" and is published by Computer Associates International, Inc., Islandia, N.Y. This program, commonly referred to as "AutoSys", manages jobs and schedules within the computer system and controls individual applications to begin jobs when prerequisite jobs are complete. However, the type of scheduling performed by AutoSys may not result in timely and efficient completion of jobs in some cases.

SUMMARY

In light of the foregoing, embodiments of the present invention concern a method of operating a computer system to run a first application program on the computer system, to run a second application program on the computer system, and to run a data availability manager (DAM) program on the computer system. The first application program is operative to indicate to the DAM program that a first data item processed by the first application program is available for further processing. The DAM program is operative to determine a second data item that is dependent for processing upon availability of the first data item and to indicate to the second application program that the second data item is ready for processing.

In some aspects, the second application program may be operative to request the DAM program to report a status of the second data item and the DAM program may indicate to the second application program, in response to the request, that the second data item is ready for processing. In other aspects, the DAM program may indicate a status of the second data item as ready for processing by publishing a notification with respect to the second data item, and the second application program may subscribe to the notification.

In some aspects, the second data item may consist of a report of securities holdings for a single client account. The first application program may be for loading data into a database, and the second application program may be for generating a report from information stored in the database.

In another aspect, a method of operating a computer system is provided to receive a request from a first application program regarding a first data item, to determine that the first data item is dependent on a second data item, a third data item and a fourth data item, and to receive an indication from a second application program that the second data item is available for processing, to receive an indication from a third application program that the third data item is available for processing, and to receive an indication from a fourth application program that the fourth data item is available for processing, with the first, second, third and fourth application programs all being different from each other. After receiving the indications from the second, third and fourth application programs, the method responds to the request by indicating to the first application program that the first data item is ready for processing.

In some aspects, the determination that the first data item is dependent on the second, third and fourth data items may include accessing mapping data that indicates items upon which the first data item is dependent.

In still another aspect, a method of operating a computer system is provided to change a status of a data item from unavailable to available, to generate, in response to the change of status, a report that requires availability of the data item, to change the status of the data item from available to unavailable, to again change the status of the data item from unavailable to available, and to again generate the report, in response to the second change of status of the data item from unavailable to available.

In still another aspect, a method of operating a computer system is provided to receive an indication that a first data item is available for processing, to determine a second data item that is dependent for processing upon availability of the first data item, and to change the status of the second data item from unavailable to ready for processing.

In still another aspect, a method of operating a computer system is provided to change a status of a first data item from unavailable to ready for processing each time either one of two conditions is satisfied. A first one of the conditions is that every data item upon which the first data item depends is available for processing. A second one of the conditions is that a time deadline has expired.

As used herein and in the appended claims, "data item" refers to any piece or element of data, data set, data structure and/or report that may be generated or provided by an application program.

Thus, in some aspects, processing of a job by one application may be started as soon as the data required from other applications is ready, and without waiting for completion of jobs by the other applications. Consequently, processing of jobs such as production of reports for client brokerage accounts may be completed in a timely manner.

With these and other advantages and features of the invention that will become hereinafter apparent, the invention may be more clearly understood by reference to the following detailed description of the invention, the appended claims, and the drawings attached hereto.

BRIEF DESCRIPTION OF THE DRAWINGS

FIG. 6A shows a portion of an example report that may be generated by the computer system of FIG. 1.

DETAILED DESCRIPTION

In general, and for the purposes of introducing concepts of embodiments of the present invention, a data availability manager (DAM) program operates on a computer system to inform application programs executing on the system when data items needed by the application programs are ready for processing by the application programs. As a result, the application programs may commence processing particular tasks immediately upon the necessary data becoming available. The DAM program may be employed in a computer system that is operated by a securities trading broker that serves institutional traders. The DAM program may facilitate timely generation of reports. For example, a report on the securities holdings in a particular client account may be generated by a reporting application as soon as the data required for the report is produced by another application or applications, and before the other applications have completed processing jobs in which the needed data was produced.

Figure 1:
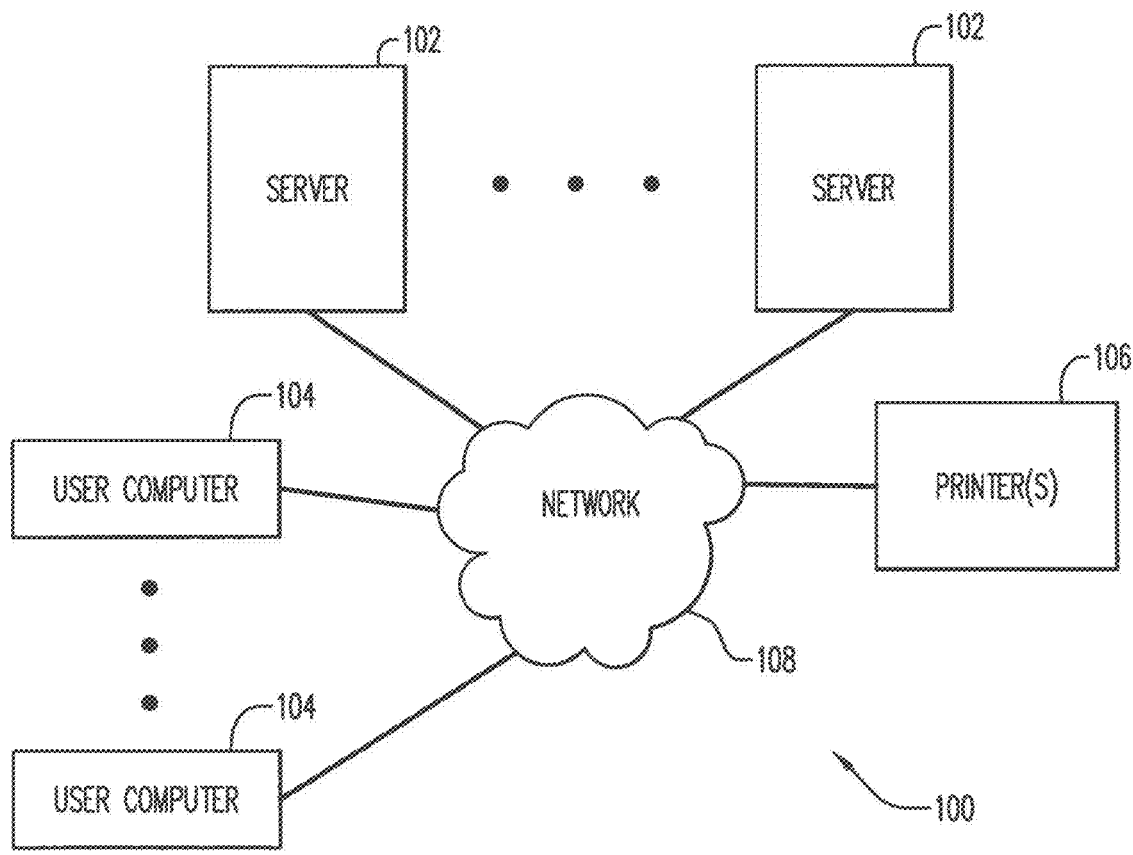
FIG. 1 is a block diagram of a computer system according to some embodiments of the invention.

Features of some embodiments of the present invention will now be described by first referring to FIG. 1. FIG. 1 is a block diagram of a computer system 100 according to some embodiments of the invention. The computer system 100 includes one or more server computers 102, and a number of user computers 104. Further, the computer system 100 may include one or more printers (indicated at 106) and a data communication network 108 to which the other system components are connected (at least from time to time). The data communication network 108 may permit data communication among the other components of the computer system 100. For example, users of the system may operate user computers 104 to request information via the data communication network 108 from the sever computers 102.

The computer system 100, in its hardware aspects, may be largely or entirely conventional. For example, conventional server computer hardware may be used in constituting the server computers 102. Moreover, the user computers 104 may all be conventional desktop or notebook computers. Software aspects of the server computers 102 will be described in more detail below.

Figure 2:
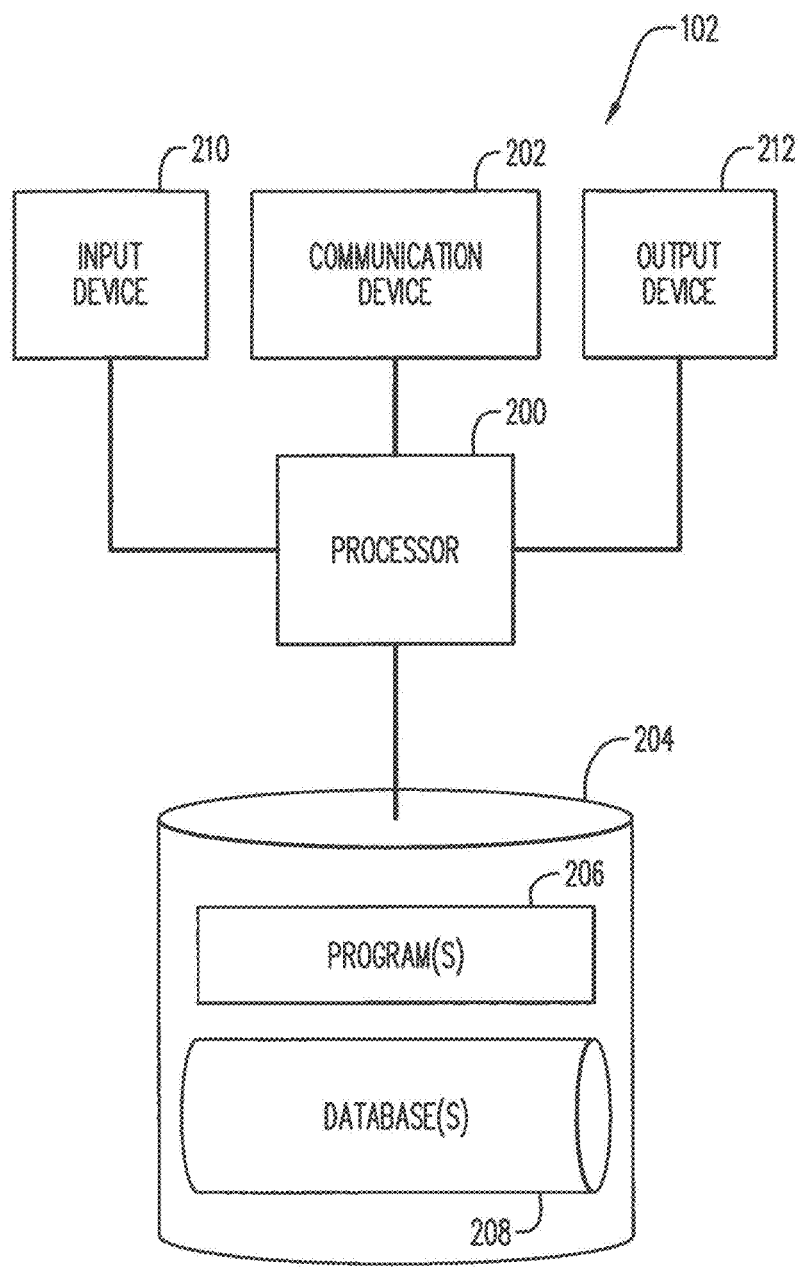
FIG. 2 is a block diagram of one or more server computers that may be part of the computer system of FIG. 1.

Reference is now made to FIG. 2, where an embodiment of at least one of the servers 102 is shown. As depicted, server 102 includes a computer processor 200 operatively coupled to a communication device 202 and storage device 204.

Processor 200 may be constituted by one or more conventional processors, and may, for example, comprise RISC-based and other types of processors. Processor 200 operates to execute processor-executable process steps so as to control the elements of the server 102 to provide desired functionality.

Communication device 202 may be used to communicate, for example, with other devices (such as other servers 102, user computers 104 or printer(s) 106). Communication device 202 is therefore preferably configured with hardware suitable to physically interface with desired external devices and/or network connections. For example, communication device 202 may comprise an Ethernet connection to a local area network through which server 102 may receive and transmit information.

Storage device 204 may comprise any appropriate information storage device, including combinations of magnetic storage devices (e.g., magnetic tape and hard disk drives) optical storage devices such as CDs and/or DVDs, and/or semiconductor memory devices such as Random Access Memory (RAM) devices and Read Only Memory (ROM) devices.

Storage device 204 stores one or more programs 206 for controlling processor 200. The programs 206 comprise processor-executable process steps of server 102, and may include process steps that constitute processes provided in accordance with principles of the present invention to implement one or more application programs and/or a DAM program as described below. Processor 206 performs instructions of programs 206, and thereby may operate in accordance with the present invention. In some embodiments, programs 206 may be configured, at least in part, as a neural network or other type of program using techniques known to those skilled in the art to achieve the functionality described herein. Among the functions implemented via the programs 206 may be host server functions.

Any or all process steps of server 102 may be read from a computer-readable medium, such as a floppy disk, a CD-ROM, a DVD-ROM, a Zip™ disk, a magnetic tape, or a signal encoding the process steps, and then stored in storage device 204 in a compressed, uncompiled and/or encrypted format. Processor-executable process steps being executed by processor 200 may typically be stored temporarily in RAM (not separately shown) and executed therefrom by processor 200. In alternative embodiments, hardwired circuitry may be used in place of, or in combination with, processor-executable process steps for implementation of processes according to embodiments of the present invention. Thus, embodiments of the present invention are not limited to any specific combination of hardware and software.

Storage device 204 may also store databases 208, including, for example, data that may be generated by and/or accessed by one or more of the application programs that execute on the server 102 or on another component of the computer system 100. For example, the databases 208 may store data regarding securities trading activities, client securities positions, and securities pricing information. Other databases may also be provided.

There may also be stored in storage device 204 other unshown elements that may be necessary for operation of server 102, such as an operating system, a database management system, other applications, other data files, and "device drivers" for allowing processor 200 to interface with devices in communication with communication device 202. These elements are known to those skilled in the art, and are therefore not described in detail herein.

The server 102 may also include one or more input devices 210 in communication with the processor 200 and one or more output devices 212 in communication with the processor 200. The input device(s) 210 and the output device(s) 212 may permit a system administrator or other user to provide input to the processor 200 or to receive output from the processor 200.

Figure 3:
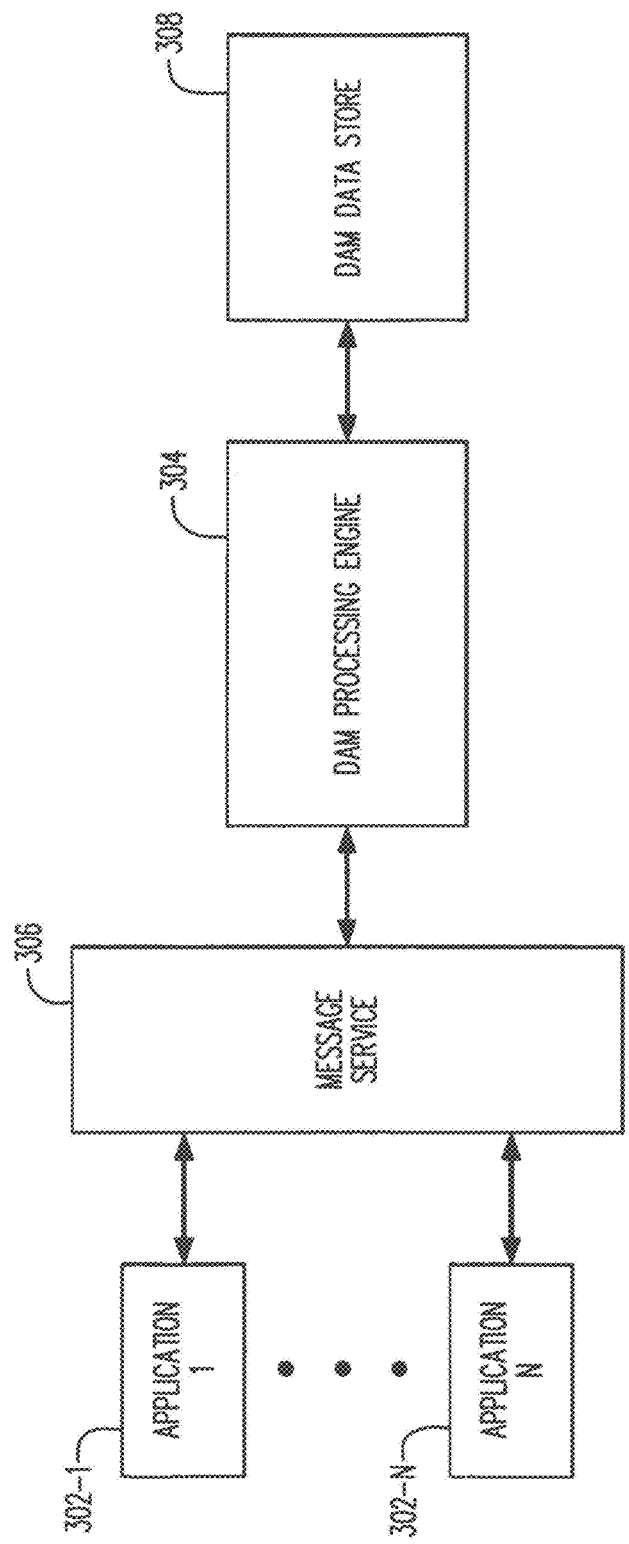
FIG. 3 illustrates in block diagram form software programs that may be executed in the computer system of FIG. 1.

FIG. 3 illustrates in block diagram form software programs that may be executed in the computer system 100. For example, the software programs, or a subset of them, may execute on one or more of the servers 102. The software programs illustrated in FIG. 3 include a number of application programs 302. In some embodiments, one or more of the application programs 302 may operate to collect data related to securities trading activities. One or more of the application programs 302 may collect data related to securities positions held by clients of a firm that operates the computer system 100. One or more of the application programs 302 may generate reports relating to securities trading activities and/or securities positions. The number of applications programs 302 that run on the computer system 302 may be four or greater.

The software programs also include a processing engine 304 for a DAM program. As will be seen, the DAM program may act as a clearinghouse for information as to which data items generated or to be generated by the application programs 302 are ready for processing by other ones of the application programs 302. Message service software 306 (e.g., the "Enterprise Message Service" software package available from Tibco Software, Palo Alto, Calif.) allows for exchanging of messages between the DAM processing engine 304 and the application programs 302 and among the application programs 302. A data store 308 is associated with the DAM processing engine 304 to store data used by the DAM processing engine 304 in performing its data availability clearinghouse functions. In some embodiments, the DAM data store 308 may be implemented by using a conventional data base manager such as Sybase. One or more of the application programs 302 may run on the same server 102 with the DAM processing engine 306 and/or on another server or servers 102. Except for their interactions with the DAM program, as described below, the application programs 302 may operate in accordance with conventional practices, in some embodiments.

Figure 4:
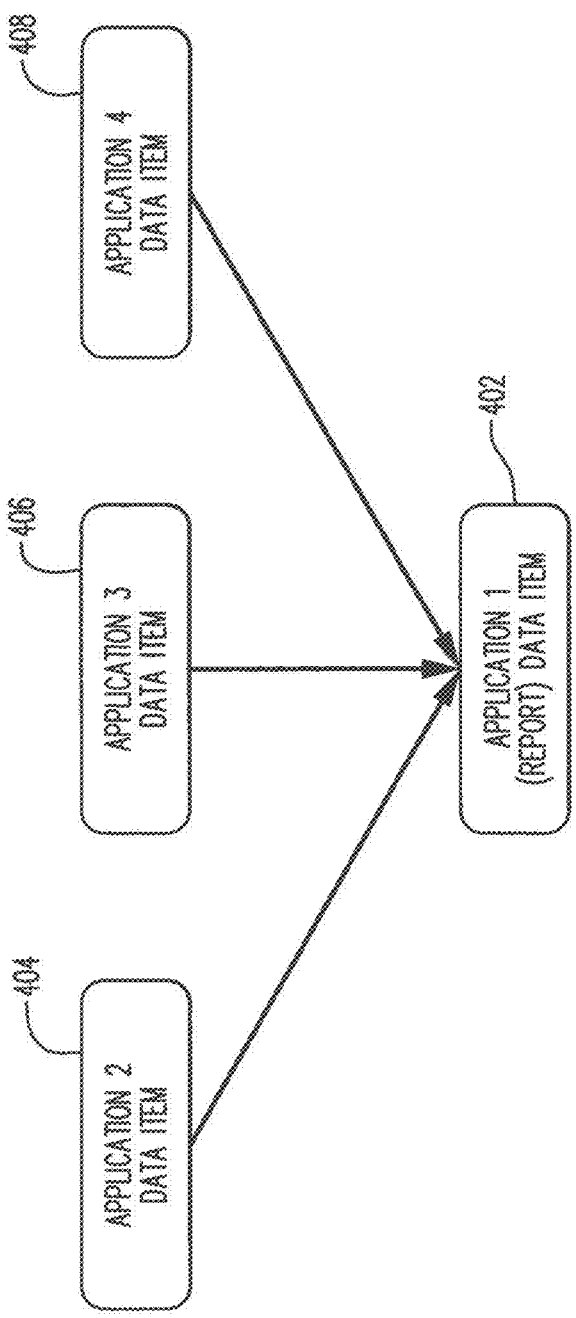
FIG. 4 illustrates an example of a dependency rule relationship among data items that may be processed by application programs in the computer system of FIG. 1.

FIG. 4 illustrates an example of a dependency rule relationship among data items that may be processed by application programs in the computer system 100. According to the rule illustrated in FIG. 4, a data item 402 (e.g., a report) to be generated by a first application program cannot be generated until a data item 404 generated or to be generated by a second application program, a data item 406 generated or to be generated by a third application program, and a data item 408 generated or to be generated by a fourth application program are all available for processing by the first application program. It may be said that the data item 402 is "dependent" on data items 404, 406 and 408, that data items 404, 406 and 408 are "parents" of data item 402, and that data item 402 is a "child" of data items 404, 406 and 408. Data that reflects the dependency rule relationship illustrated in FIG. 4 may be input into the computer system 102 during a set-up mode of the DAM program and stored in the DAM data store 308.

Each data item shown in FIG. 4 may, but need not, be the only kind of data item generated or provided by the corresponding application program.

In at least some cases, examples given below in regard to operation of a DAM program and interactions between a DAM program and application programs will be presented in the context of a computer system that may be operated by a securities trading broker that serves institutional investors. However, the invention may also be applied in other contexts.

Figure 5:
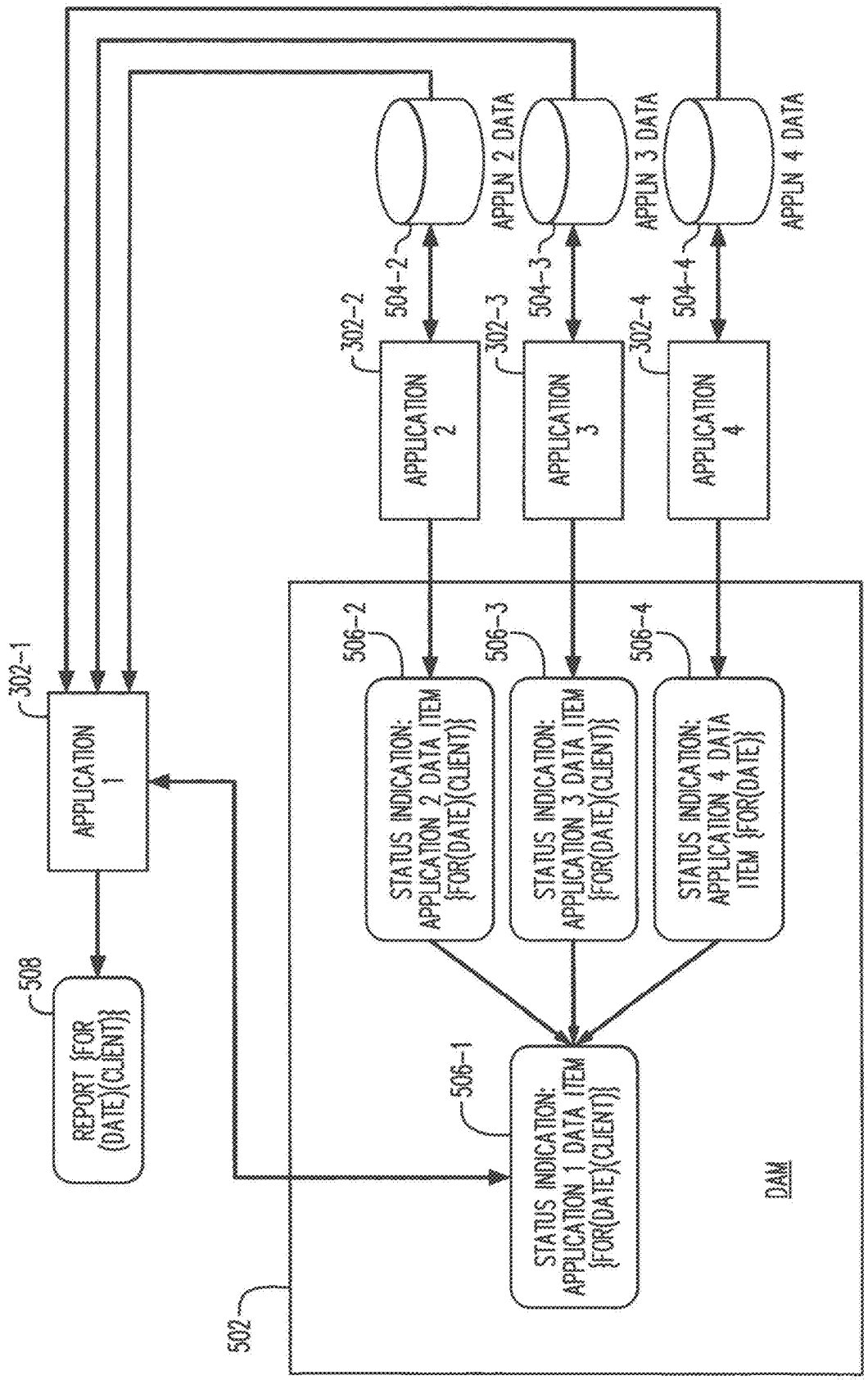
FIG. 5 is a diagram that illustrates one example of interaction among a data available manager (DAM) program and application programs in the computer system of FIG. 1.

FIG. 5 is a diagram that illustrates one example of interaction among a data availability manager (DAM) program (indicated at 502 in FIG. 5) and application programs 302 in the computer system 100. Application program 302-1, which is the application to generate data item 402 (FIG. 4) may be a program for generating aggregated securities position reports, and the particular data item instance involved may be the aggregated position report for a particular client as of a particular date. Application program 302-2 (FIG. 5), which is the application to generate data item 404 (FIG. 4), may be a program which collects, stores and maintains information regarding securities positions for the clients of a brokerage firm that operates the computer system 100. Application program 302-3 (FIG. 5), which is the application to generate data item 406 (FIG. 4), may be an application that combines data from various sources into a single report. Application program 302-4 (FIG. 5), which is the application to provide data item 408 (FIG. 4), may be a program which receives and stores security price information provided by a securities market information feed (not shown).

A data store 504-2 is a associated with application program 302-2 to store and make available for access data generated/provided by application program 302-2. A data store 504-3 is a associated with application program 302-3 to store and make available for access data generated/provided by application program 302-3. A data store 504-4 is a associated with application program 302-4 to store and make available for access data generated/provided by application program 302-4.

When application 302-2 has generated the position data for a particular client for a particular date, it provides input to the DAM program 502 such that the status indication 506-2 as to the position data (data item) for the client and date indicates that the data item is available. When application 302-3 has generated the contractual data for a particular client for a particular date, the application program 302-3 provides input to the DAM program 502 such that the status indication 506-3 as to the contractual data (data item) for the client and date indicates that the data item is available. When application 302-4 has the securities pricing data for a particular date, the application program 302-4 provides input to the DAM program 502 such that the status indication 506-4 as to the pricing data (data item) for the date indicates that the data item is available. When the three status indications for a particular client and date are all indicated as available, the DAM program 502 may make the status indication for the aggregation report data item for the client and date indicate that the report data item is "runnable", i.e. ready for processing by the application program 302-1. An indication to this effect is provided from the DAM program 502 to the application program 302-1, so that the application program 302-1 is informed that all the data it needs for the report for the particular client and date is available. The application program 302-1 then accesses the data stores 504-2, 504-3 and 504-4 to pull the data for the report, and the application program 302-1 generates the report (indicated at 508) for the particular client and date. In addition, the application program 302-1 provides to the DAM program 502 input so that the DAM program can set the status indication 506-1 to "available" for use in generating any data item that is dependent on the report.

Figure 6:
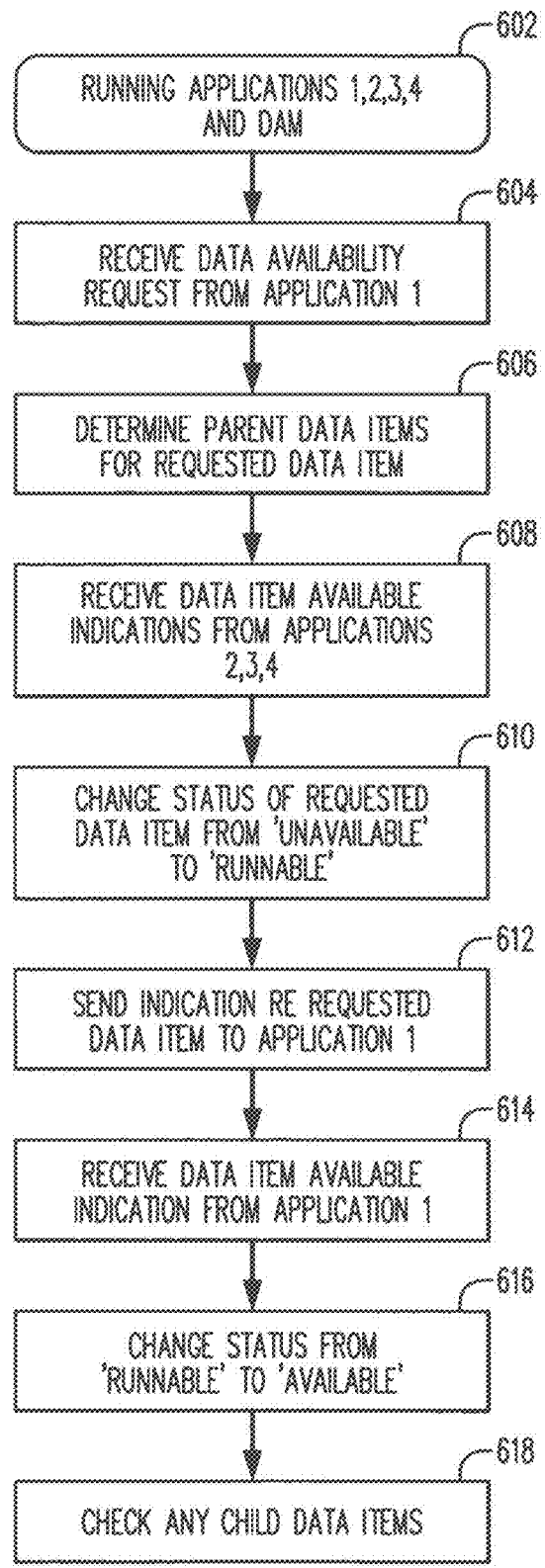
FIG. 6 is a flow chart that illustrates a process that may be performed by the DAM program.

FIG. 6 is a flow chart that illustrates a process that may be performed by the DAM program 502. Indicated at 602 in FIG. 6 is a starting condition for the process of FIG. 6, the condition being that the DAM program 502 and the application programs 302-1, 302-2, 302-3 and 302-4 are being run on the computer system 100 (e.g., on one or more of the constituent servers 102 of the computer system 100). At 604, the DAM program 502 receives from the application program 302-1 a data availability request which pertains to a particular data item to be generated by the application program 302-1. In effect, by the data availability request, the application program 302-1 inquires of the DAM program 502 as to whether the parent data items for the data item to be generated by the application program 302-1 are all available for processing by the application program 302-1. For purposes of illustration, it may be assumed that the data item to be generated by application program 302-1 is a report, as of a particular point in time, of the securities holdings of a particular client of a securities brokerage firm that operates the computer system 100. Relevant parameters, which may be indicated in the data availability request, may include a client identifier (e.g., client name) which identifies the client, and the date as of which the report is to be made.

At 606, the DAM program 502 determines which are the required parent data items upon which the requested data item depends. For example, the DAM program 502 may refer to a dependency rule for the requested type of data item, such as the rule illustrated in FIG. 4. From such a rule, the DAM program may determine the types of the required parent data items, and the DAM program may parameterize the parent data item types with parameters specified (e.g., client identifier and/or date) specified in the data availability request. The resulting data items axe the parent data items for the data item specified in the data item request. In the example referred to above, the parent data items may be (a) position data for the client and date in question, provided or to be provided by application program 302-2; (b) contractual data for the client and date in question, provided or to be provided by application program 302-3; and (c) price data for the date in question, provided or to be provided by application program 302-4.

As indicated at 608, at some point in time before or after the DAM program 502 receives the data availability request, the DAM program 502 receives from the application programs 302-2, 302-3 and 302-4 indications that the respective parent data items are ready for processing (i.e., "available"). This occurs after the respective application program completes whatever processing is required to generate or make available the particular parent data item in question. As indicated at 610, once all of the parent data items are available, the DAM program 502 changes the status of the requested data item from "unavailable" to "runnable" (i.e., ready for processing). This may occur immediately after receiving the data availability request, if all of the parent data items had already been indicated by the respective application programs to be available. Alternatively, this may occur once the last of the parent data items to become available is indicated as available by the respective application program. In any case, after changing the status of the requested data item to "runnable", and as indicated at 612 in FIG. 6, the DAM program 502 may then provide an indication (for example, a message) to application program 302-1 that the requested data item is ready for processing by the application program. In actions that are not indicated in FIG. 6 (since not performed by the DAM program), application program 302-1 may then access data stores 504-2, 504-3 and 504-4 to access data items generated/provided by the application programs 302-2, 302-3, 302-4 so that the application program 302-1 can generate the report in question. FIG. 6A illustrates a portion of an example of such a report.

When the application program 302-1 has completed generation of the report, it provides an indication to the DAM program 502 that the data item (the report) is now "available". Block 614 in FIG. 6 represents the DAM program 502 receiving this indication from application program 302-1. At 616, DAM program 502 responds to the indication from application program 302-1 by changing the status of the report data item from "runnable" to "available". At 618, DAM program 502 determines whether there are any child data items of the report data item, and if so, as to whether the status of any such child data items should now be changed to "runnable" in view of the availability of the report data item. If so, DAM program 502 will so change the status of the child data item(s) and provide indication(s) of the changed status to a respective application program or programs.

Figure 7:
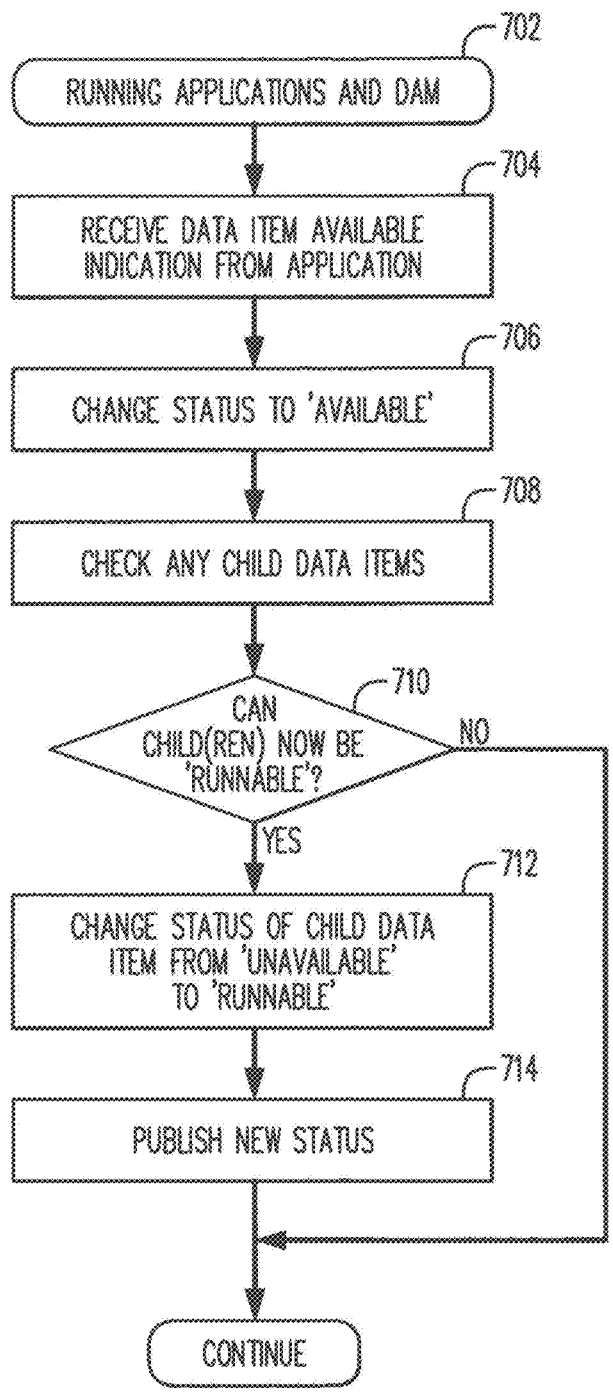
FIG. 7 is a flow chart that illustrates an alternative process that may be performed by the DAM program.

FIG. 7 is a flow chart that shows an alternative example of a process that may be performed by the DAM program.

At 702, as a condition to the process, the DAM program and two or more application programs are being run on the computer system 100. At 704, the DAM program receives from one of the application programs an indication that a data item generated/provided by the application program is available (i.e., that the application program has completed processing of the data item). As indicated at 706, in response to the indication from the application program, the DAM program changes to "available" the status of the data item in question. At 708, the DAM program determines what, if any, child data items there are with respect to the data item that has just become available. A decision 710 is made with respect to each of the child data items as to whether the child data item can now be indicated as "runnable". That is, with respect to each child data item, the DAM program determines whether all of the parent data items of the child data item have the status "available". For each child data item with respect to which this condition is satisfied, the DAM program changes the status of the child data item in question to "runnable" (712 in FIG. 7) and then publishes 714 (via a suitable facility of the computer system 100) the updated status of the child data item. With this arrangement, instead of the application programs submitting data availability requests to the DAM program, the application programs may subscribe to the indications published by the DAM program and/or may poll the publishing facility to be informed of the runnability of data items to be generated/provided by the application programs.

Figure 8:
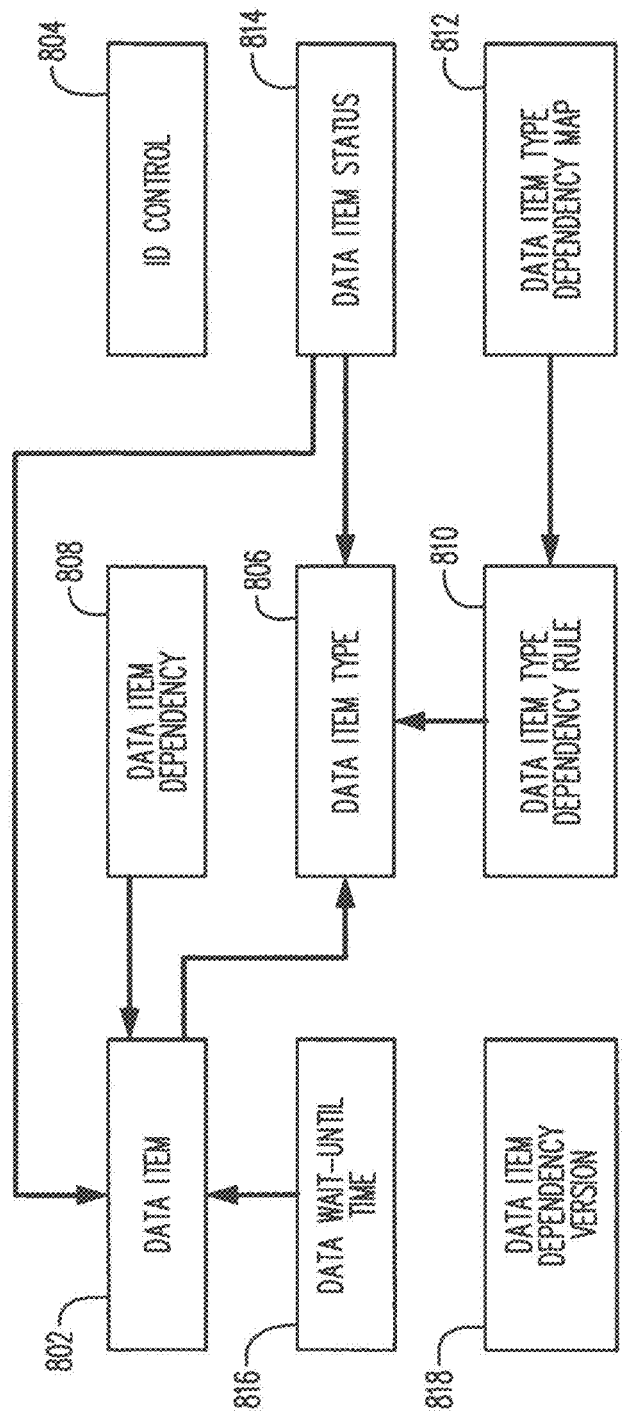
FIG. 8 is a diagram that illustrates relationships among database entities employed in connection with the DAM program.

FIG. 8 is a diagram that illustrates relationships among database entities that may be employed in connection with the DAM program. Each of the database entities shown in FIG. 8 may be constituted by a table stored in a database in the DAM data store 308 (FIG. 3).

Referring to FIG. 8, reference numeral 802 indicates a data item database entity. The data item database entity may include a data item identifier that uniquely identifies the data item, an identifier that identifies the application program that generates/provides the data item, and as identifier that identifies the type of the data item.

Reference numeral 804 indicates an ID control database entity which is used to create unique identifiers for the data item.

Reference numeral 806 indicates a data item type database entity which is used to store the type of the data item if the type has a name that is too long to store in the data item database entity 802.

Reference numeral 808 indicates a data item dependency database entity which lists the specific data items that are parents of the data item represented by data item database entity 802.

Reference numeral 810 indicates a data item type dependency rule database entity which indicates dependency rule relationships (see, e.g., FIG. 4) which are applicable to data items of the type which applies to the data item represented by data item database entity 802.

Reference numeral 812 indicates a data item type dependency map database entity which represents mappings, relevant to the data item represented by data item database entity 802, between data item instances of different types. For example, as illustrated below, these mappings may represent "belongs-to" relationships between specific data item instances, such as "Account 1234 belongs to Client Group ABC", or "Client Group ABC belongs to Client XYZ".

Reference numeral 814 indicates a data item status database entity which stores the current status (e.g., unavailable, runnable or available, etc.) of the data item represented by data item database entity 802.

Reference numeral 816 indicates a data wait-until time database entity that may indicate a "wait-until time" that may be applicable to the data item represented by the data item database entity 802. As will be discussed further below, the "wait-until time" may be a deadline upon which the data item is given the status "wait-runnable" so that the data item may be processed by its application program even if not all of the parent data items are currently available. Not every data item necessarily has a wait-until time. That is, some data items may never become wait-runnable, and will be processed only if all parent data items become available.

Reference numeral 818 indicates a data item dependency version database entity. As discussed further below, a dependency version may be used by an application program to select from among different dependency rules that may be applicable from time to time to a particular data item.

Figure 9:
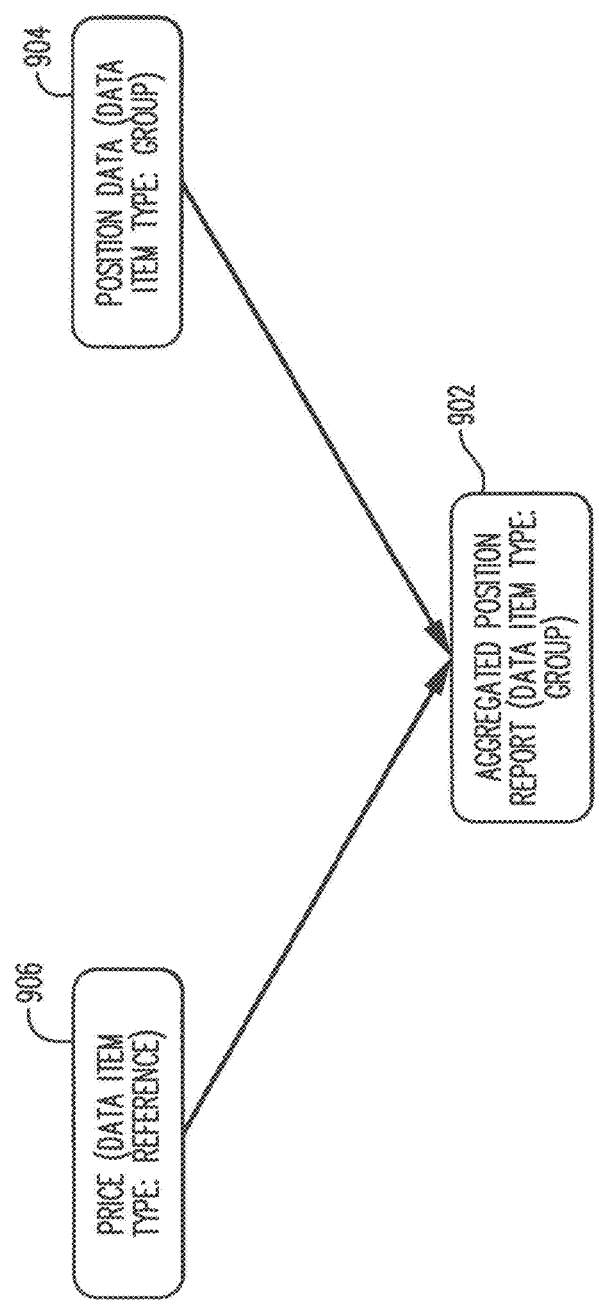
FIG. 9 illustrates another example of a dependency rule relationship among data items that may be processed by application programs in the computer system of FIG. 1.

FIG. 9 illustrates another example of a dependency rule relationship among data items that may be processed by application programs in the computer system 100. According to the dependency rule indicated by FIG. 9, an aggregated position report data item 902 for a particular client group has two parent data items, namely the position data data item 904 for the group in question and a price data item 906. The latter data item is of the "reference" type since it has applicability over a variety of specific instances of the child data items. It will be noted that the data items 902 and 904 are both of the same type (both "group").

Figure 10:
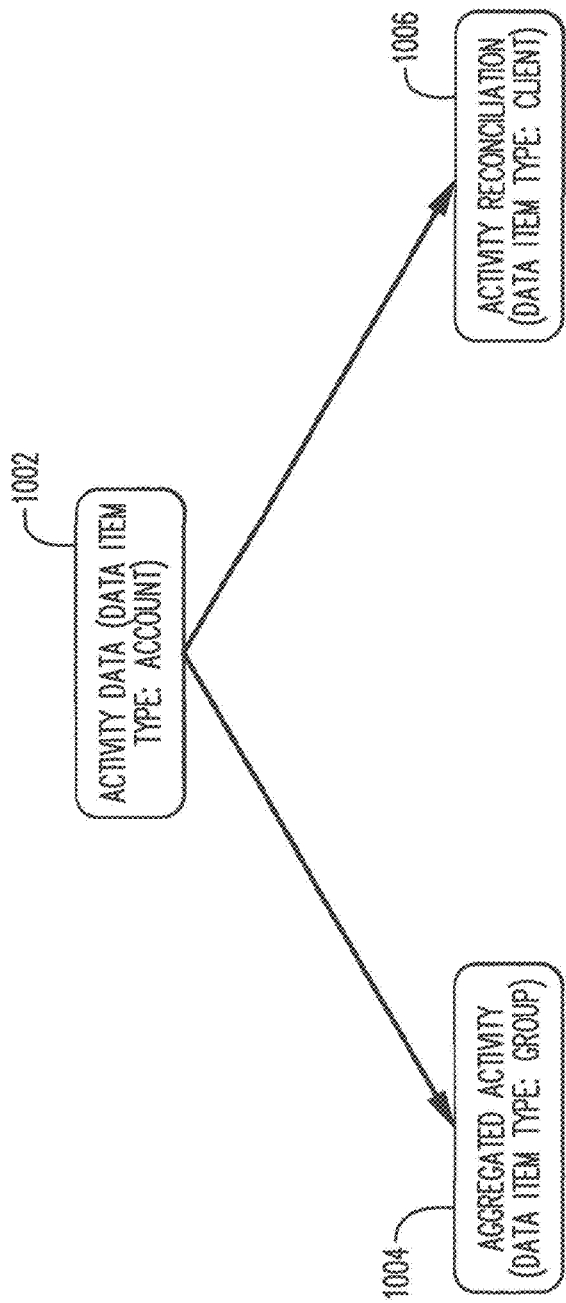
FIG. 10 illustrates still another example of a dependency rule relationship among data items that may be processed by application programs in the computer system of FIG. 1.
Figure 11:
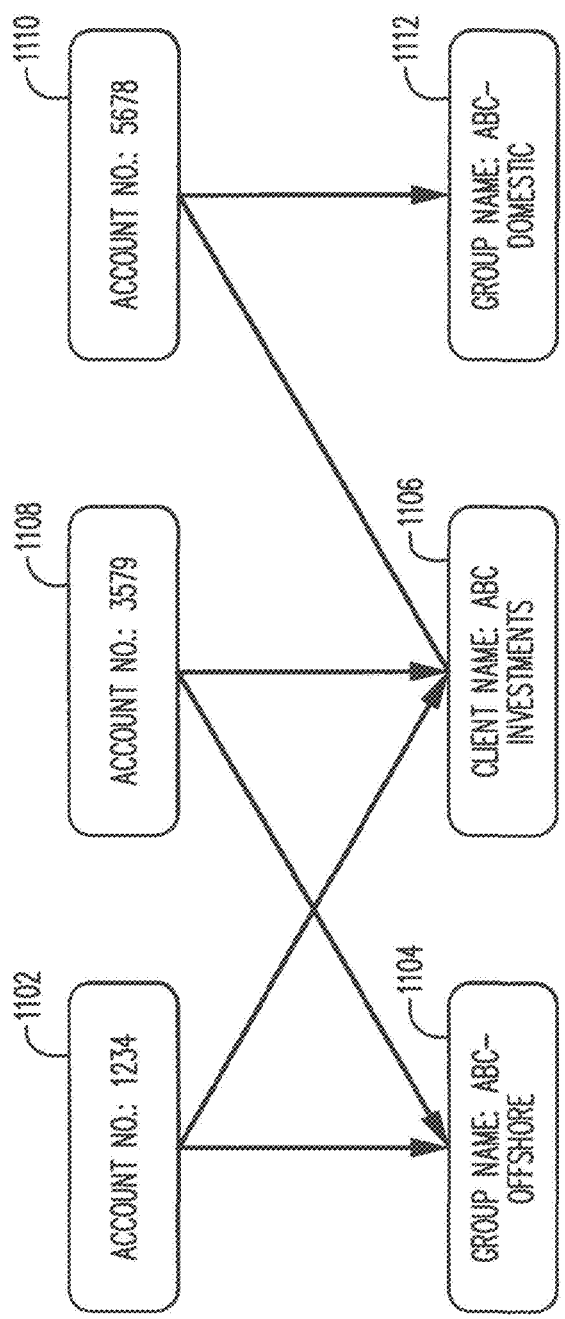
FIG. 11 illustrates an example of a dependency mapping among data items that may be processed by application programs in the computer system of FIG. 1.

FIG. 10 illustrates still another example of a dependency rule relationship among data items that may be processed by application programs in the computer system 100. According to the dependency rule indicated by FIG. 10, an aggregated position report data item 1002 is the parent of two child data items, namely an aggregated activity data item 1004 and an activity reconciliation data item 1006. Note that parent data item 1002 is of a different type ("account") from both child data item 1004 (type="group") and child data item 1006 (type="client"). Consequently, a further dependency mapping relationship among particular data item type instances will be needed to provide the complete dependency relationship between data item 1004 or data item 1006 and their parent data item. For example, such a dependency mapping may reflect "belongs-to" relationships among the particular data item instances. FIG. 11 illustrates an example of dependency mapping relationships. Thus, account no. 1234 (reference numeral 1102) has a belongs-to relationship to each of the group named "ABC-Offshore" (reference numeral 1104) and to the client named "ABC Investments" (reference numeral 1106). Account no. 3579 (reference numeral 1108) has a belongs-to relationship to each of the group named "ABC-Offshore" (1104) and the client named "ABC Investments" (1106). Account no. 5678 (reference numeral 1110) has a belongs-to relationship to each of the group named "ABC-Domestic" (reference numeral 1112) and the client named "ABC Investments" (1106).

Continuing with the examples illustrated in FIGS. 10 and 11, an aggregated activity data item (1004, FIG. 10) instance for the group named "ABC-Offshore" is dependent on two instances of the activity data item 1002, namely the instances for account nos. 1234 and 3579.

Figure 12:
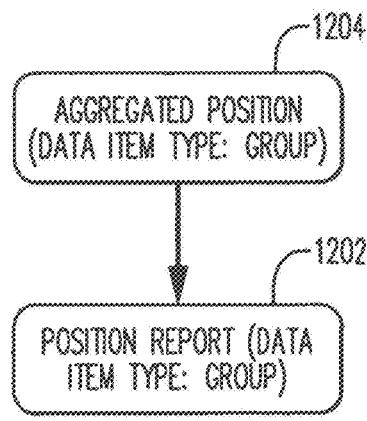
FIG. 12 illustrates yet another example of a dependency rule relationship among data items that may be processed by application programs in the computer system of FIG. 1.
Figure 13:
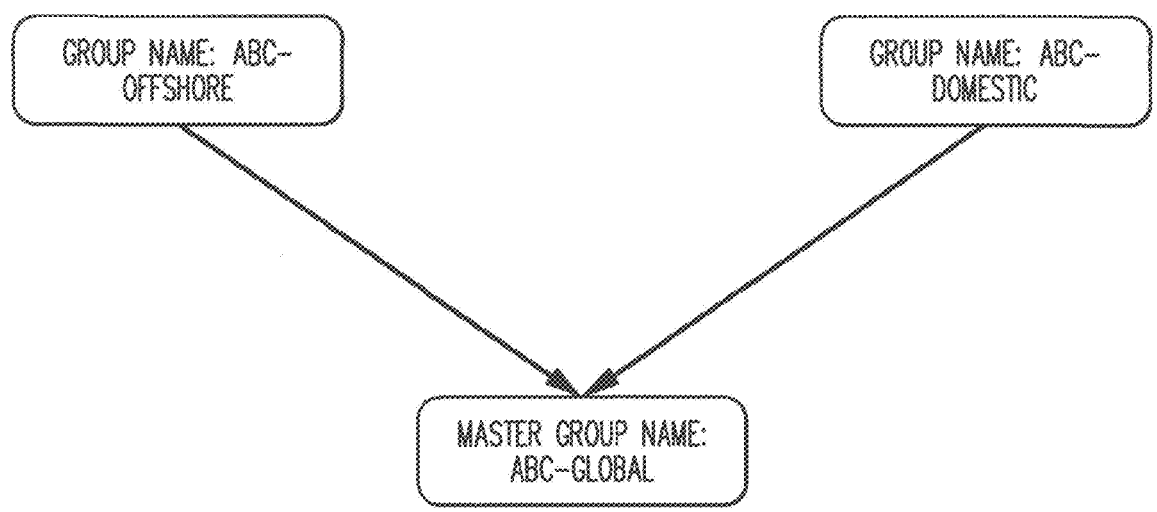
FIG. 13 illustrates an example of another dependency mapping among data items that may be processed by application programs in the computer system of FIG. 1.

A "type override" feature that may be implemented in connection with some embodiments of the DAM program will now be described with reference to FIGS. 12-14. FIG. 12 illustrates an example dependency rule that will be used to explain the type override feature, and FIG. 13 illustrates an example dependency mapping that will be used to explain the type override feature. As seen from FIG. 12, in this example a position report data item 1202 (having the type "group") is dependent on an aggregated position data item 1204 (also having the type "group"). It is noted that both the data items 1202 and 1204 are of the same type, so that ordinarily an instance for a particular group of the data item 1202 would have as its parent the instance for the same group of the data item 1204. In the dependency mapping relationships illustrated in FIG. 13, both the group named "ABC-Offshore" and the group named "ABC-Domestic" have a belongs-to relationship to a master group (also known as a group-of-groups) named "ABC-Global".

Figure 14:
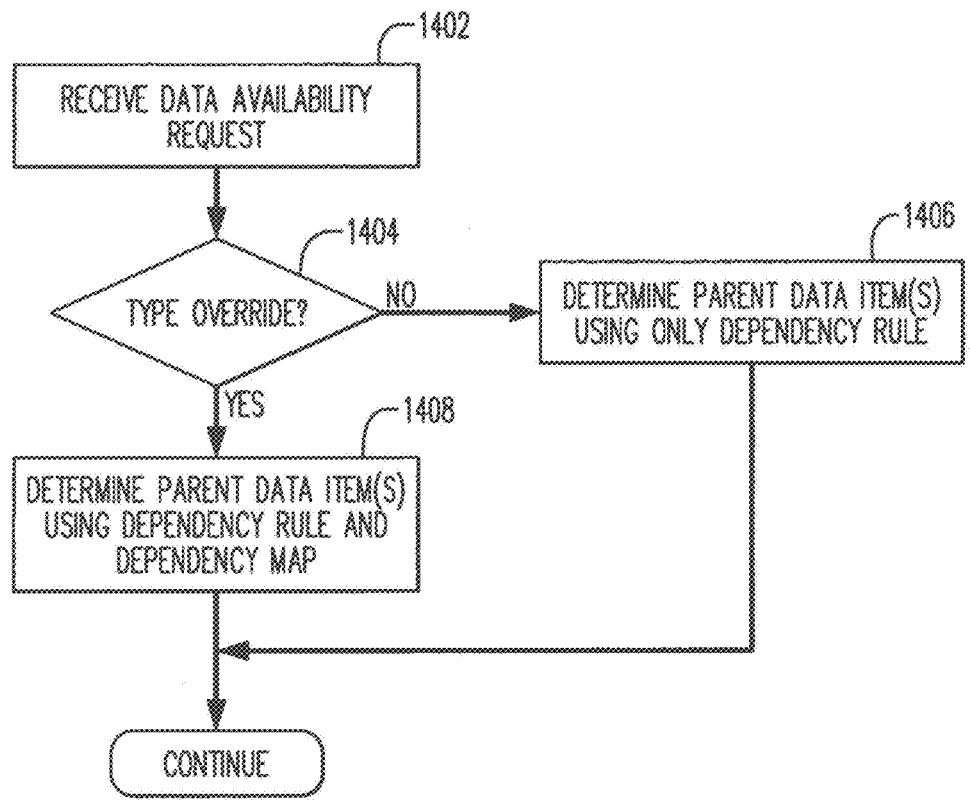
FIG. 14 is a flow chart that illustrates a process that may be performed by the DAM program.

FIG. 14 is a flow chart that illustrates a process to implement the type override feature. At 1402, the DAM program receives from an application program a data availability request. It will be assumed for purposes of this example that the data availability request concerns an instance of the position report data item 1202. Then, at 1404, the DAM program determines whether the data availability request invoked the type override feature (by e.g., setting a "type override" flag). If the type override feature is not invoked, then, as indicated at 1406, the DAM program determines the parent data item or items of the requested data item by referring to the dependency rule for the requested data item. (It is assumed in this case that the dependency rule indicates that only data items of the same type as the requested data item are parents of the requested data item.) It may be assumed in such a case that the data availability request received in this case is for an instance that corresponds to a group, say the group named "ABC-Offshore". Consequently, following the dependency rule of FIG. 12, the parent for the requested data item is the instance of the aggregated position data item which corresponds to the group named "ABC-Offshore".

However, considering again the determination made at 1404, now assume that the type override feature was invoked by the data availability request. In such a case, the data item instance requested is for a type other than its usual type. In this instance, assume that the requested type is a master group (such as the master group named "ABC-Global"). As a result, and as indicated at 1408, the DAM program determines the dependency of the requested data item using both the dependency rule and a dependency map which relates different types of data item parameter values to each other. In the particular example assumed, the parent items determined for the requested data items are the two instances of the aggregated position data item that correspond to the groups named "ABC-Offshore" and "ABC-Domestic", since these two groups belong to the requested master group "ABC-Global".

A "dependency versioning" feature that may be implemented in connection with some embodiments of the DAM program will now be described with reference to FIGS. 9, 15 and 16. The dependency versioning feature effectively permits an application program to select a dependency ride to be applied by the DAM program in determining a parent data item or items for a data availability request sent to the DAM program by the application program.

As previously described, FIG. 9 illustrates a dependency rule relationship in which an aggregated position report data item 902 has as its parents a position data data item 904 and a price data item 906. For present purposes, this dependency rule relationship may be considered version 1 of the dependency rule for the aggregated position report data item.

Figure 15:
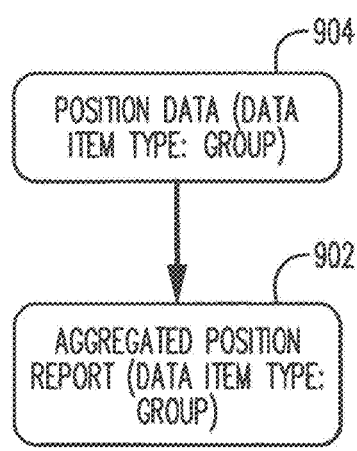
FIG. 15, taken with FIG. 9, illustrates an alternate version of a dependency rule relationship.

FIG. 15 illustrates version 2 of the dependency rule relationship for the aggregated position report data item 902. In the version 2 dependency rule, data item 902 has only one parent, namely the position data data item 904.

Figure 16:
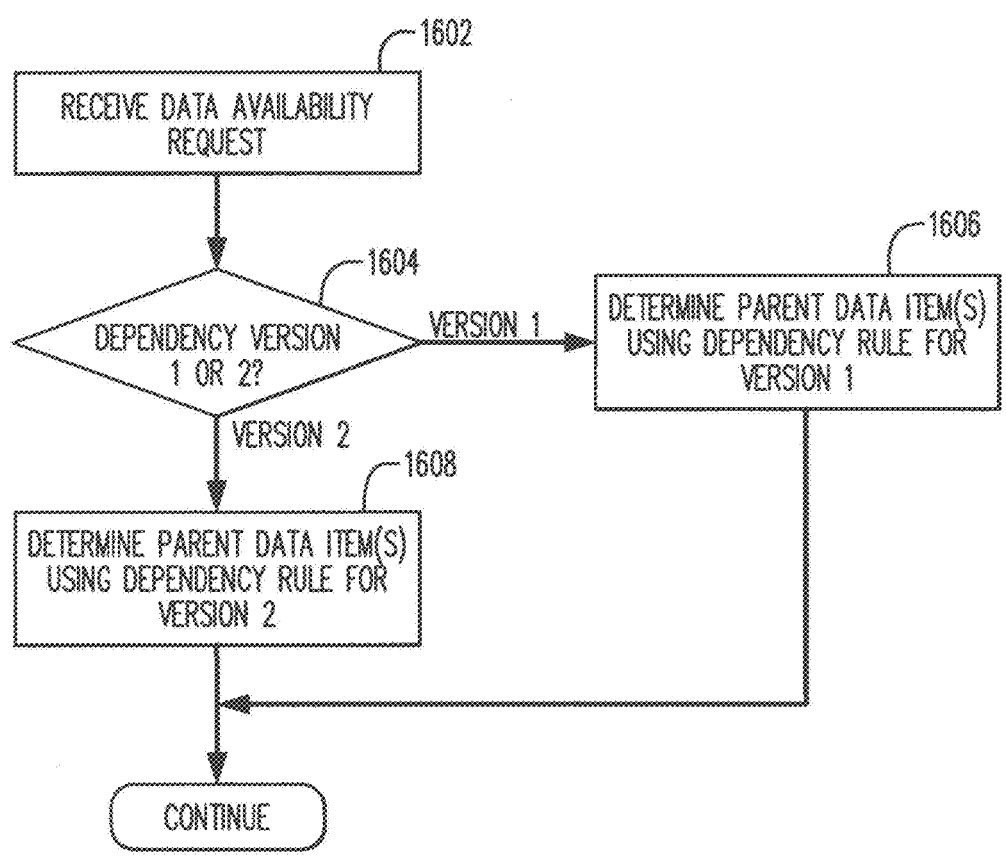
FIG. 16 is a flow chart that illustrates a process that may be performed by the DAM program.

FIG. 16 is a flow chart that illustrates a process to implement the dependency versioning feature. At 1602, the DAM program receives from an application program a data availability request. It is assumed that the data availability request specifies either version 1 or version 2 as the dependency rule to be applied by the DAM program in determining the parent data item or items for the requested data item. At 1604, the DAM program determines which version is specified by the data availability request. If version 1 was specified, then, at 1606, the DAM program uses the dependency rule of FIG. 9 to determine the parent data items (in this case the position data data item 904 and the price data item 906) for the requested aggregated position report data item 902.

However, in some instances, the application program may specify version 2 as the dependency rule to be applied. For example, in the case of the report 902, it may be necessary to reissue the report (e.g., to correct an error) some time after the original issuance of the report and at a time when the price data is no longer available. In such a case, the application program is able to specify the dependency rule version shown in FIG. 15 so that the report is issued without relying on the no-longer-available price data (for example, the re-issued report may be footnoted to indicate that price information is not provided). As indicated at 1608, when version 2 is specified by the data availability request, the dependency rule illustrated in FIG. 15 is applied by the DAM program to determine the parent data item (in this case only position data data item 904) for the requested data item.

It should be understood that the two dependency rule versions shown in FIGS. 9 and 15 are only an example set of dependency rule versions, and that many other sets of dependency rule versions may alternatively be employed. The number of versions in a set of versions may be more than two.

Figure 17:
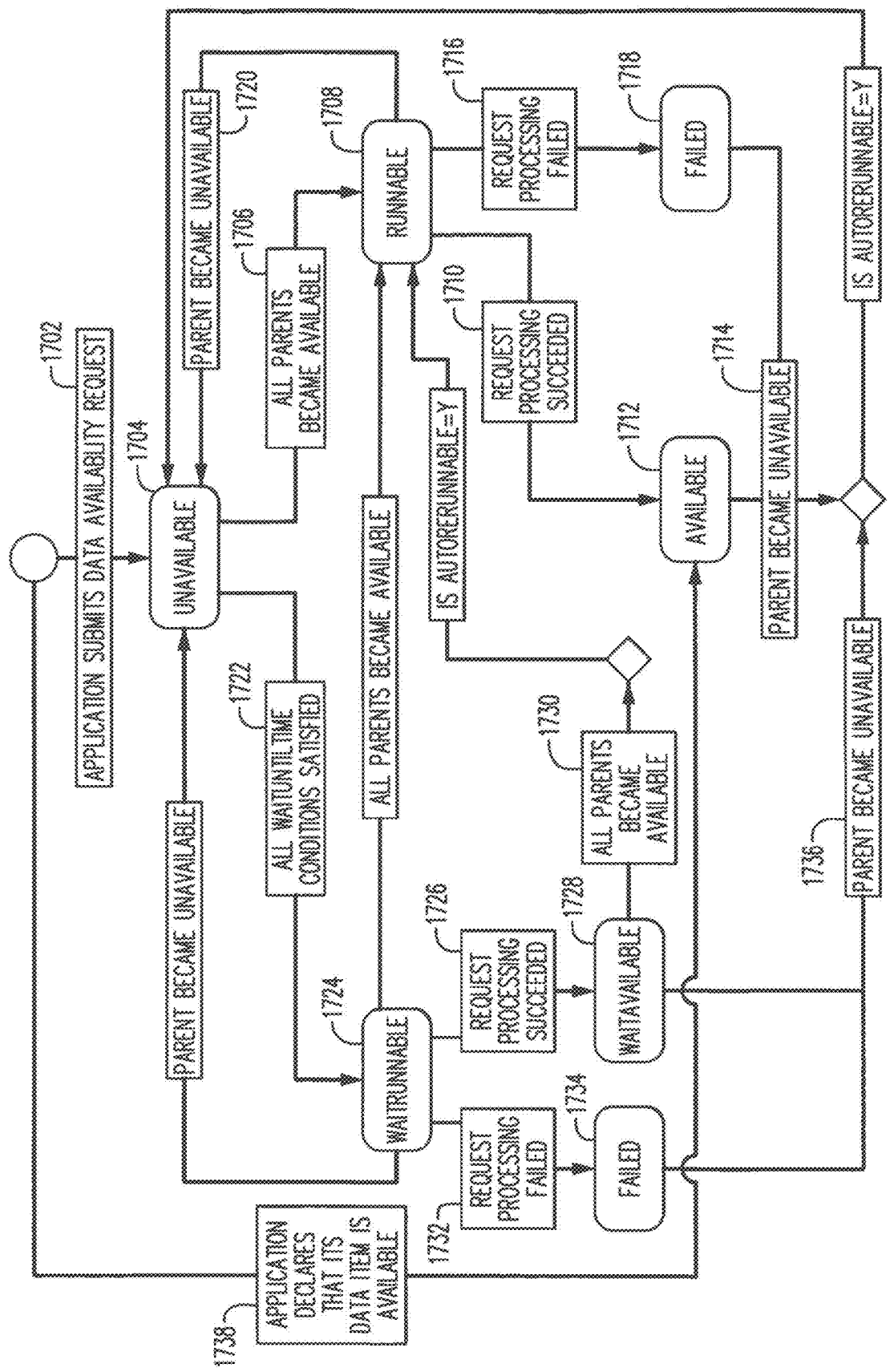
FIG. 17 is a diagram that illustrates potential sequences of status changes for a data item in connection with the DAM program.

FIG. 17 is a diagram that illustrates potential sequences of status changes for a data item in connection with the DAM program.

At 1702, an application program submits a data availability request to the DAM program. At 1704, the DAM program assigns the status "unavailable" to the requested data item. If all the parents of the requested data item are "available" (1706), the DAM program changes the status of the requested data item to "runnable" (1708). If the application then successfully processes (1710) the data item, the DAM program changes the status of the data item to "available" (1712) (e.g., after being so instructed by the application). Thereafter, if a parent of the data item becomes unavailable (1714), and if the data item has been designated as "auto-rerunnable", then the DAM program sets the status of the data item back to "unavailable" (1704). Consequently, if the unavailable parent becomes available again (1706), the data item status may again be set to "runnable" (1708) and the data item may be automatically run (processed) again by the application and then have its status again changed to "available" (1712). If the processing of the data item fails (1716) when its status is "runnable", the status of the data item is set to "failed" (1718). If, while in "failed" status 1716, a parent becomes unavailable, and if the data item has been designated "auto-rerunnable", then the status of the data item is again set to "unavailable" (1704). If a parent of the data item becomes "unavailable" (1720) when the status of the data item is "runnable", then the status of the data item is again set to "unavailable" (1704).

If, while the status of a data item is "unavailable", the wait-until condition is met 1722 (e.g., the deadline is reached), then the DAM program changes the status of the data item to "wait-runnable" (1724). If the application then successfully processes (1726) the data item, the DAM program changes the status of the data item to "wait-available" (1728). If, while the data item status is "wait-available", all of its parents become available (1730) and if the data item has been designated as "auto-rerunnable", then the DAM program again changes the status of the data item to "runnable" 1708, and the data item may be processed again by the application.

If, while the status of the data item is "wait-runnable", the processing of the data item by the application fails 1732, then the status of the data item is set to "failed" (1734). If, while the status of the data item is "failed" 1734 or "wait-available" 1728, a parent of the data item becomes unavailable 1736, and if the data item has been designated "auto-rerunnable", then the status of the data item is again set to "unavailable"(1704). If the application provides to the DAM program an indication 1738 that a data item is available, then the DAM program sets the status of the data item accordingly (1712).

The above descriptions of processes that may be provided in accordance with the invention is not intended to imply a fixed order of performing the process steps. Rather, the process steps may be performed in any order that is practicable. For example, in the case of the process of FIG. 3, some or all of the indications from application programs 302-2, 302-3 and 302-4 that their respective data items are available may occur before or after the data availability request from application program 302-1.

In some embodiments which call for data availability requests, the DAM program may in some cases be operable to automatically generate a data availability request for a data item that is a child of another data item for which a data availability request is received from an application program. In some embodiments, the DAM program is able to generate a data availability request in cases where the DAM program is able to supply all parameters for the data availability request.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A non-transitory computer readable medium comprising instructions that when executed cause one or more processors to:
    receive, from one or more executable first applications, an indication that a first data item generated by the one or executable more first applications is available for processing;
    in response to the indication, change a status of the first data item to indicate the first data item is available;
    determine, using one or more of multiple data dependency rules, that a second data item to be generated by an executable second application is dependent upon an availability of the first data item, wherein the data dependency rules indicate that different ones of multiple second data items are processed by different ones of multiple second applications and are dependent on different ones of multiple first data items;
    after the determination that the second data item is dependent upon the availability of the first data item, determine whether the second data item is runnable and, if runnable, change a status of the second data item to runnable; and
    publish the runnable status of the second data item to enable the executable second application to be informed of the runnable status of the second data item.

2. The non-transitory computer readable medium of claim 1, wherein the medium further comprises instructions that when executed cause the one or more processors to:
    receive, from an executable third application, a second indication that a third data item generated by the executable third application is available for processing; and
    in response to the second indication, change a status of the third data item to indicate the third data item is available.

3. The non-transitory computer readable medium of claim 2, wherein the medium further comprises instructions that when executed cause the one or more processors to:
    determine, using the one or more of the multiple data dependency rules, that the second data item is also dependent upon an availability of the third data item.

4. The non-transitory computer readable medium of claim 3, wherein the medium further comprises instructions that when executed cause the one or more processors to:
    determine that the status of the first data item is available and that the status of the third data item is available.

5. The non-transitory computer readable medium of claim 1, wherein the medium further comprises instructions that when executed cause the one or more processors to:
    determine, using the one or more of the multiple data dependency rules, that the second data item to be generated by the executable second application is dependent upon an availability of a third data item generated by the one or more executable first applications or another executable application.

6. The non-transitory computer readable medium of claim 5, wherein the determination whether the second data item is runnable is based on the availability of the first data item and the availability of the third data item.

7. An apparatus comprising:
    at least one memory configured to store multiple data dependency rules; and
    at least one processor configured to:
        receive, from one or more executable first applications, an indication that a first data item generated by the one or more executable first applications is available for processing;
        in response to the indication, change a status of the first data item to indicate the first data item is available;
        determine, using one or more of the data dependency rules, that a second data item to be generated by an executable second application is dependent upon an availability of the first data item, wherein the data dependency rules indicate that different ones of multiple second data items are processed by different ones of multiple second applications and are dependent on different ones of multiple first data items;
        after the determination that the second data item is dependent upon the availability of the first data item, determine whether the second data item is runnable and, if runnable, change a status of the second data item to runnable; and
        publish the runnable status of the second data item to enable the executable second application to be informed of the runnable status of the second data item.

8. The apparatus of claim 7, wherein the at least one processor is further configured to:
    receive, from an executable third application, a second indication that a third data item generated by the executable third application is available for processing; and
    in response to the second indication, change a status of the third data item to indicate the third data item is available.

9. The apparatus of claim 8, wherein the at least one processor is further configured to:
    determine, using the one or more of the multiple data dependency rules, that the second data item is also dependent upon an availability of the third data item.

10. The apparatus of claim 9, wherein the at least one processor is further configured to:
    determine that the status of the first data item is available and that the status of the third data item is available.

11. The apparatus of claim 7, wherein the at least one processor is further configured to determine, using the one or more of the multiple data dependency rules, that the second data item to be generated by the executable second application is dependent upon an availability of a third data item generated by the one or more executable first applications or another executable application.

12. The apparatus of claim 11, wherein the determination whether the second data item is runnable is based on the availability of the first data item and the availability of the third data item.

13. A method comprising:
receiving, at a data availability manager (DAM) application from one or more executable first applications, an indication that a first data item generated by the one or more executable first applications is available for processing;
in response to the indication, changing a status of the first data item within the DAM application to indicate the first data item is available;
determining, using one or more of multiple data dependency rules, that a second data item to be generated by an executable second application is dependent upon an availability of the first data item, wherein the data dependency rules indicate that different ones of multiple second data items are processed by different ones of multiple second applications and are dependent on different ones of multiple first data items;
after the determination that the second data item is dependent upon the availability of the first data item, determining whether the second data item is runnable and, if runnable, changing a status of the second data item to runnable; and publishing, by the DAM application, the runnable status of the second data item to enable the executable second application to be informed of the runnable status of the second data item.

14. The method of claim 13, further comprising:
receiving, from an executable third application, a second indication that a third data item generated by the executable third application is available for processing; and
in response to the second indication, changing a status of the third data item to indicate the third data item is available.

15. The method of claim 14, further comprising:
determining, using the one or more of the multiple data dependency rules, that the second data item is also dependent upon an availability of the third data item.

16. The method of claim 15, further comprising:
determining that the status of the first data item is available and that the status of the third data item is available.

17. The method of claim 13, further comprising:
determining, using the one or more of the multiple data dependency rules, that the second data item to be generated by the executable second application is dependent upon an availability of a third data item generated by the one or more executable first applications or another executable application.

18. The method of claim 17, wherein the determination whether the second data item is runnable is based on the availability of the first data item and the availability of the third data item.

* * * * *